United States Patent [19]

Breiter et al.

[11] Patent Number: 4,854,994

[45] Date of Patent: Aug. 8, 1989

[54] HOT PRESS FOR PRESSING INDUSTRIAL LAMINATES

[75] Inventors: Horst Breiter, Dortmund; Helmut Enger, Krefeld; Uwe Teuwen, Bönen, all of Fed. Rep. of Germany

[73] Assignee: Hoesch Maschinenfabrik Deutschland AG, Dortmund, Fed. Rep. of Germany

[21] Appl. No.: 110,126

[22] Filed: Oct. 19, 1987

[30] Foreign Application Priority Data

Oct. 28, 1986 [DE] Fed. Rep. of Germany ....... 3636600

[51] Int. Cl.⁴ .............................................. B29C 43/02
[52] U.S. Cl. .................................... 156/228; 100/195; 156/288; 156/382; 156/563; 425/338; 425/420; 425/DIG. 14; 425/DIG. 47
[58] Field of Search ............... 425/44, 47, 48, 51, 425/56, 57, 58, 388, 405.1, 405.2, 420, 504, DIG. 2, DIG. 4, DIG. 14, DIG. 19, DIG. 47, DIG. 60, DIG. 112, 338, 339, 389, 390, 406; 100/195, 199; 156/288, 563, 286, 382; 264/102, 313, 571, DIG. 78

[56] References Cited

U.S. PATENT DOCUMENTS

| 3,158,089 | 11/1964 | Fillol | 425/406 |
| 3,690,795 | 9/1972 | Yoshida et al. | 425/58 |
| 3,861,304 | 1/1975 | Merrill | 425/405.1 |
| 4,154,272 | 5/1979 | Huffman, Jr. | 425/338 |
| 4,222,724 | 9/1980 | Van Hullen | 425/338 |

FOREIGN PATENT DOCUMENTS

| 2153788 | 5/1973 | Fed. Rep. of Germany | 425/DIG. 47 |
| 939275 | 6/1982 | U.S.S.R. | 425/389 |

Primary Examiner—Jay H. Woo
Assistant Examiner—C. Scott Bushey
Attorney, Agent, or Firm—Thomas S. Baker, Jr.

[57] ABSTRACT

A hot press for pressing industrial laminates to single-layer pressed boards having at least one heating platen, and at least one press opening in which a sealing means including an expansible and retractable hose is associated with each press opening to alternatively seal and open said press opening.

4 Claims, 4 Drawing Sheets

HOT PRESS FOR PRESSING INDUSTRIAL LAMINATES

BACKGROUND OF THE INVENTION

1. Field of the Invention

The invention relates to a hot press for pressing industrial laminates to single-layer pressed boards comprising at least one heating platen and at least one press opening, each press opening having associated therewith a sealing means which in one region of the pressing stroke permits pressing of the laminates under vacuum.

2. Description of the Prior Art

German utility model No. 8,529,990 discloses a sealing means for pressing board stacks which is made up essentially of a metal frame and two sealing hoses.

Such a sealing means however permits pressing of industrial laminates under vacuum only in a small region of the pressing stroke. A disadvantage is that to make pressed boards or panels within a large thickness range a great number of sealing means of different height is necessary.

SUMMARY OF THE INVENTION

The invention is based on the problem of providing a sealing means for a heating press of the type mentioned at the beginning which ensures pressing of the laminates under vacuum in a greater region of the pressing stroke.

According to the invention this problem is solved in that as sealing means a hose which can be subjected to the action of a pressure medium is provided.

Preferably, the hose is formed with a plurality of sealing lips.

According to a further feature of the invention the hose is secured to the upper pressing surface of a press opening.

In an advantageous embodiment the hose is formed with a T-shaped web.

The pressure medium used is compressed air.

Hereinafter the invention will be described in detail with the aid of the drawings which show an example of embodiment schematically and in which:

DESCRIPTION OF THE PREFERRED EMBODIMENTS

A heating press 1 comprises a fixed 2 and a displaceable press crosshead 3 and four heating platens 4, 5, 6, 7.

Figure 3:
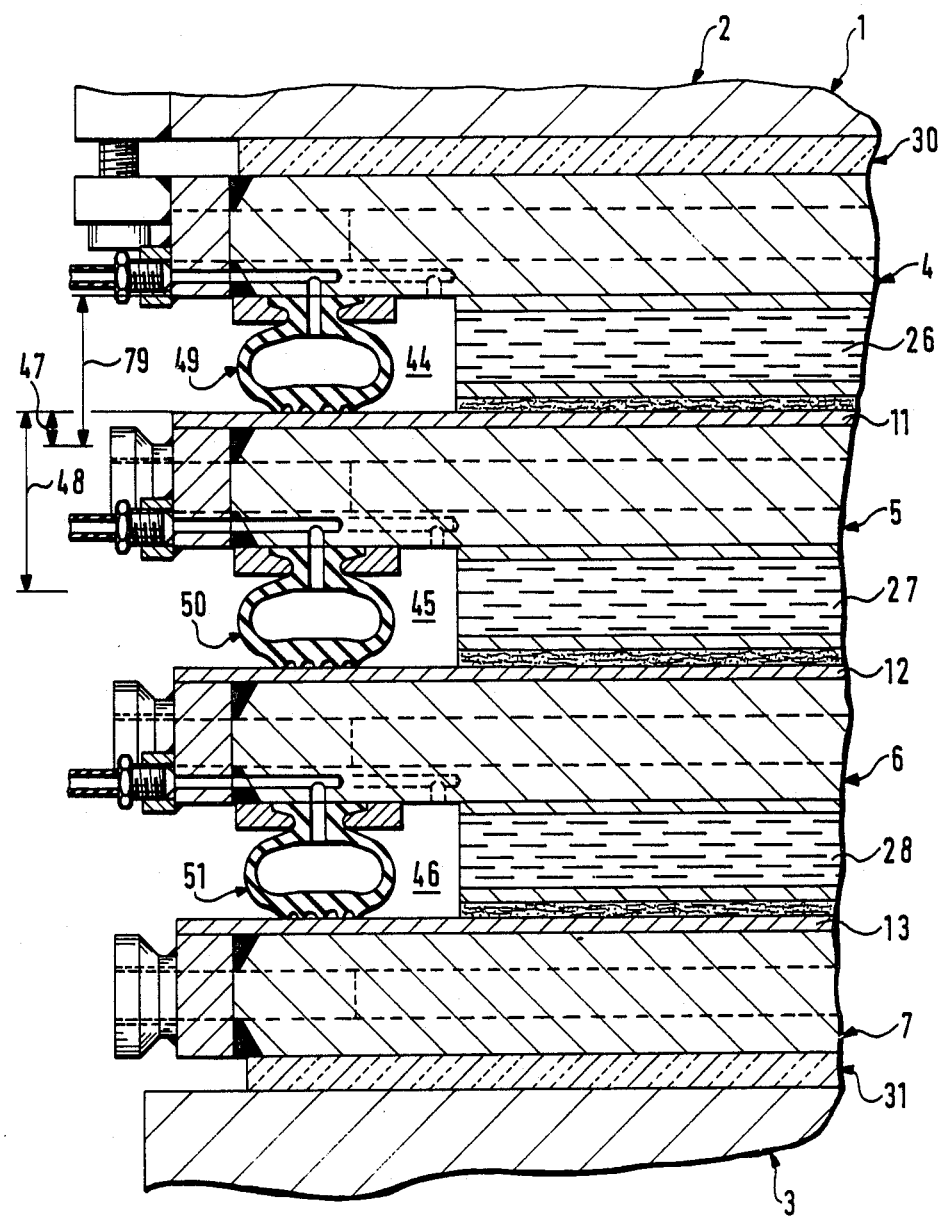
FIG. 3 is a partial section through the heating press after the pressing operation.

The four heating platens 4 to 7 form three press levels or openings 8, 9, 10 in which arranged in each case on a metal loading plate 11, 12, 13 and a pressing pad 14, 15, 16 between two pressing plates 17, 18, 19, 20, 21, 22 stacked laminates 23, 24, 25 (FIG. 1) are pressed to form a pressed board 26, 27, 28 (FIG. 3).

The heating platen 4 is screwed by means of head screws 29 to the fixed press crosshead 2. 30 denotes the insulation between the heating platen 4 and the fixed press crosshead 2 and 31 the insulation between the heating platen 7 and the displaceable press crosshead 3.

Figure 1:
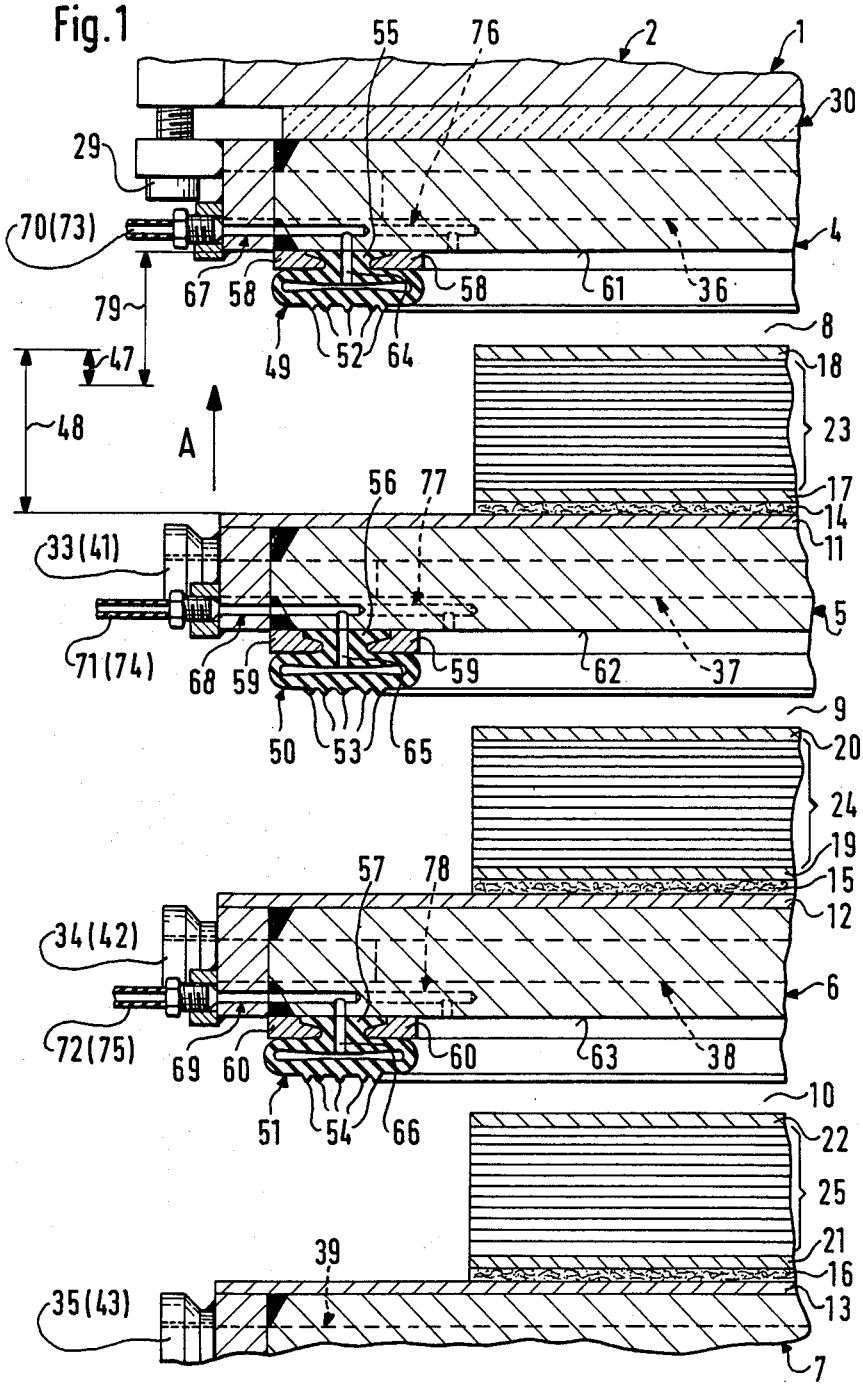
FIG. 1 is a partial section through a heating press after the charging operation.
Figure 2:
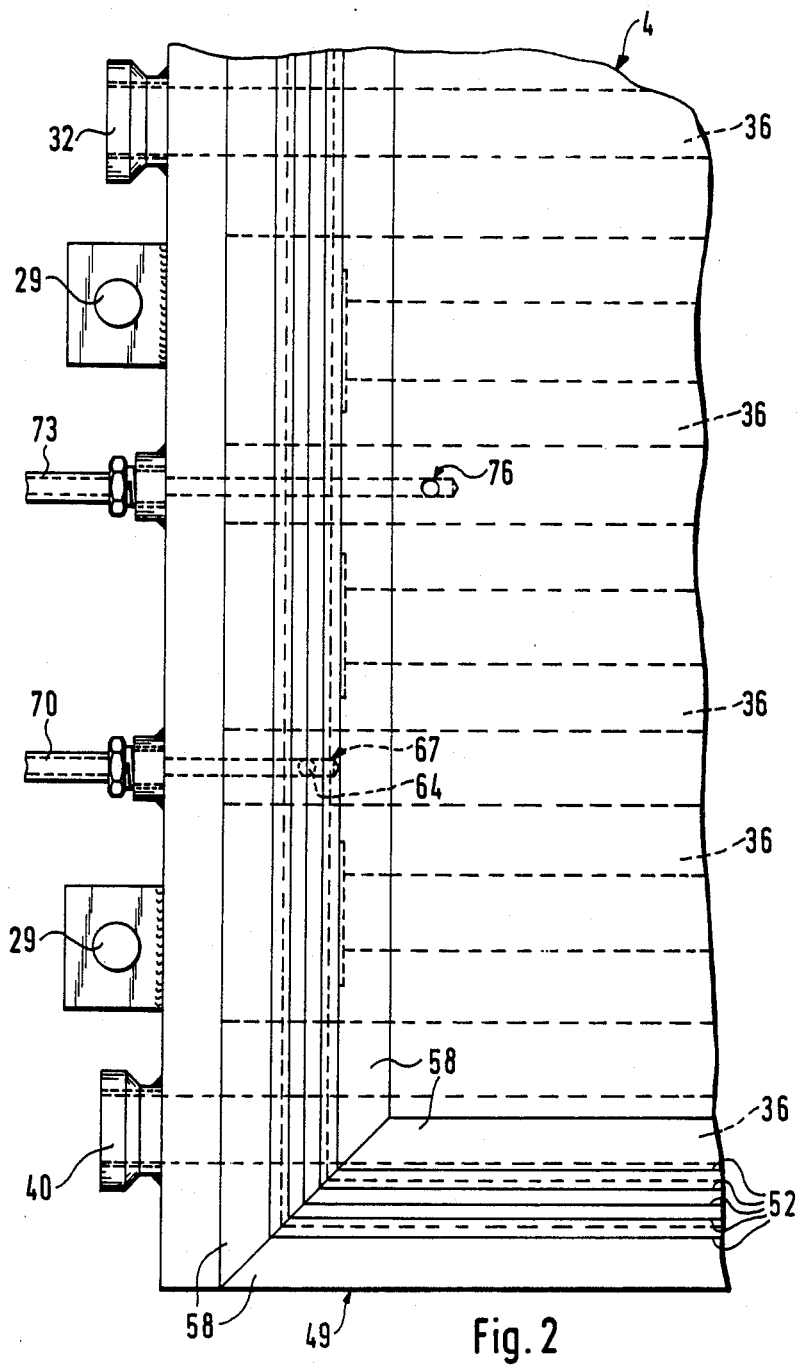
FIG. 2 is a partial section of the heating press in the direction of the arrow A of FIG. 1.

When the heating press 1 FIG. 1 is opened the heating platens 5, 6 are held by stationary support elements (not shown).

To drive the heating press 1 a plurality of pressing cylinders (not shown) is used, the pressing stroke of which is transmitted directly to the displaceable press crosshead 3.

Each heating platen 4 to 7 comprises for conducting a heating agent inlet tube pieces 32, 33, 34, 35, a heating passage system 36, 37, 38, 39 and outlet tube pieces 40, 41, 42, 43.

For sealing each pressing chamber 44, 45, 46 in a region 47 of the pressing stroke 48 a resilient hose 49, 50, 51 of silicone rubber is provided which comprises a plurality of sealing lips 52, 54, 54 and a T-shaped web 55, 56, 57. Each web 55 to 57 of a hose 49 to 51 is fixedly connected via the screwed-on clamping strips 58, 59, 60 to the upper pressing surface 61, 62, 63 of a press opening 8, 9, 10.

The hoses 49 to 51 each comprise a plurality of holes 64, 65, 66 which communicate via a passage system 67, 68, 69 to conduit hoses 70, 71, 72.

The conduit hoses 70 to 72 are connected during the charging operation to a vacuum apparatus (not shown) and during the pressing operation to a compressed air reservoir (not shown).

The vacuum apparatus is always connected to the press chambers 44 to 46, this being via the hose lines 73, 74, 75 and the passage systems 76, 77, 78.

During the charging operation the hoses 49 to 51 are placed under vacuum and assume the form shown in FIG. 1.

After the charging operation the hoses 49 to 51 are inflated by means of compressed air to a level 79.

During pressing of the laminates 23 to 25 to form single-layer pressed boards 26 to 28 the inflated hoses 49 to 51 are somewhat deformed in the region 47 of the pressing stroke 48 (FIG. 3). Part of the compressed air disposed in the hoses 49 to 51 is thereby pressed back into the compressed air tank.

Figure 4:
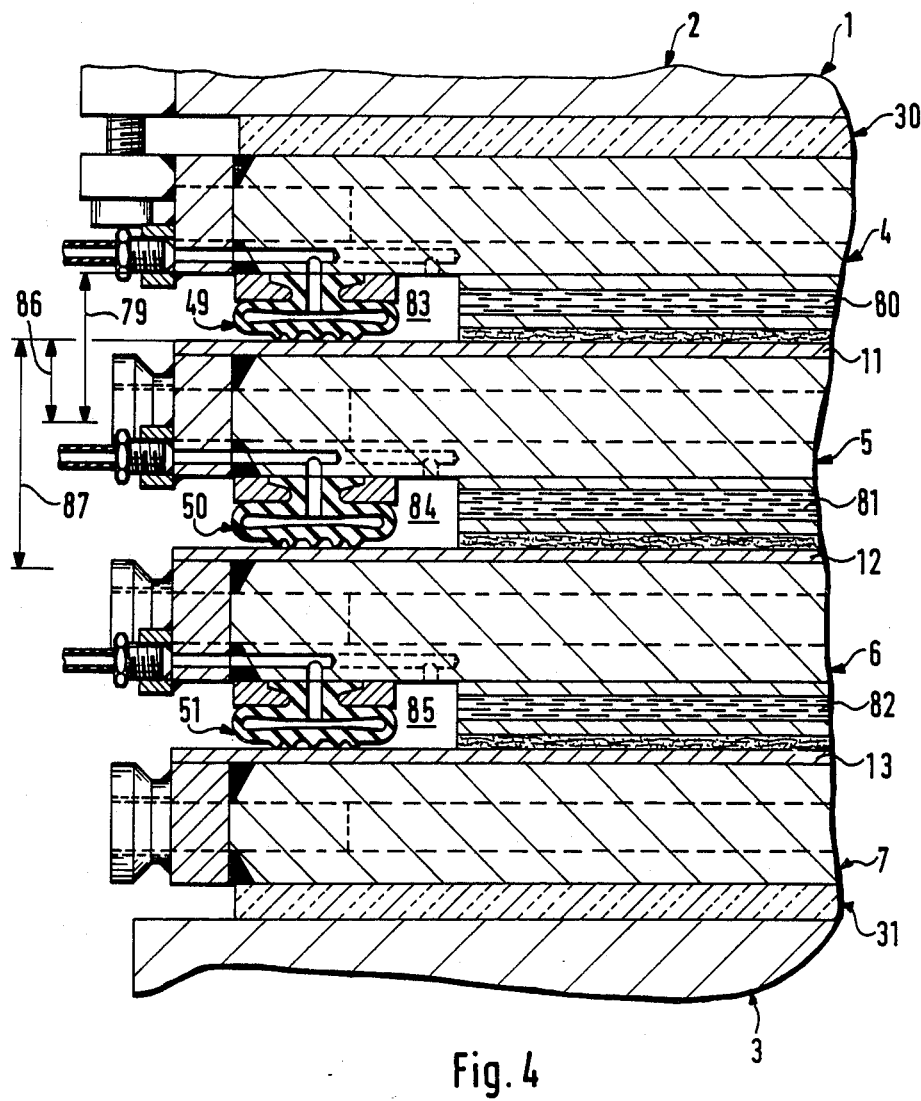
FIG. 4 is a partial section through the heating press after another pressing operation.

The proportion of the compressed air pressed back into the compressed air tank is particularly high when the heating press 1 presses stack laminates to form thin pressed panels or boards 80, 81, 82 (FIG. 4). The sealing of the pressed chambers 83, 84, 85 is in a region 86 of the press stroke 87.

We claim:

1. A method of sealing the area between the platen and loading plate of a hot press for pressing industrial laminates into a single layer pressed board having a heating platen, a loading plate, press opening defined between said platen and said plate and a sealing means between said platen and said plate, wherein said sealing means comprises a resilient expansible and retractable hose having an opening end and a closed end in which the open end is rigidly secured to the platen and the closed end is unrestrained; said hose having internal pressure fluid passages and a plurality of external sealing lips adjacent said closed end and being movable vertically downwardly to cause the closed end to engage said loading plate, a fluid source connected to said fluid passages and means for introducing and withdrawing a fluid medium into and from said pressure fluid passages comprising the steps of:

withdrawing a pressure fluid from said pressure fluid passages to cause said closed end to move vertically upwardly such that said closed end and said sealing lips disengage said loading plate to provide access to said press opening; and introducing pressure fluid into said pressure fluid passages to cause said hose to expand to move said closed end vertically downwardly to cause said sealing lips to engage said loading plate to thereby seal said press opening.

2. A hot press for pressing industrial laminates into single-layer pressed board having a heating platen, a loading plate, a press opening defined between said platen and said plate and a sealing means between said platen and said plate to permit pressing of the laminates under a vacuum in which said sealing means comprises a resilient expansible and retractable hose having an open end and a closed end in which the open end is rigidly secured to the platen and the closed end is unrestrained; said hose having internal pressure fluid passages and a plurality of external sealing lips at said closed end and being movable vertically downwardly by fluid expansion to cause the closed end to engage said loading plate, a fluid source connected to said fluid passages and means for introducing a fluid medium into said pressure fluid passages to cause said hose to expand and to move said closed end vertically downwardly causing said sealing lips to engage said loading plate to close said press opening and means for reducing the pressure of the fluid medium in said pressure fluid passages to cause said closed end of said hose to retract and move vertically upwardly to thereby withdraw said closed end and said sealing lips from said loading plate to provide access to said press opening.

3. The hot press of claim 2, in which the hose is formed with a T-shaped web.

4. The hot press of claim 2 in which the fluid medium is compressed air.

* * * * *